United States Patent [19]
de Seze

[11] Patent Number: 5,894,472
[45] Date of Patent: Apr. 13, 1999

[54] PACKET ACCESS METHOD IN A CELLULAR DIGITAL RADIO-COMMUNICATIONS SYSTEM

[75] Inventor: Fabrice de Seze, Paris, France

[73] Assignee: Alcatel Alsthom Compagnie Generale d'Electricite, Paris, France

[21] Appl. No.: 08/737,004

[22] PCT Filed: May 5, 1995

[86] PCT No.: PCT/FR95/00592

§ 371 Date: Oct. 31, 1996

§ 102(e) Date: Oct. 31, 1996

[87] PCT Pub. No.: WO95/31077

PCT Pub. Date: Nov. 16, 1995

[30] Foreign Application Priority Data

May 10, 1994 [FR] France ................................ 94 05747

[51] Int. Cl.$^6$ .................................................. H04J 3/16
[52] U.S. Cl. ........................... 370/337; 370/321; 370/458; 455/450
[58] Field of Search .................... 370/337, 336, 370/335, 347, 403, 458, 465, 321; 455/422, 450

[56] References Cited

U.S. PATENT DOCUMENTS

| | | | |
|---|---|---|---|
| 5,491,741 | 2/1996 | Farwell et al. | 370/347 |
| 5,570,352 | 10/1996 | Pöghönen | 370/335 |
| 5,590,133 | 12/1996 | Billström et al. | 370/403 |

FOREIGN PATENT DOCUMENTS

0407367A2  1/1991  European Pat. Off. ........... H04J 3/16

OTHER PUBLICATIONS

Nussler, The Public Packet Mode Mobile Data Service of the Deutsche Bundespost Telkeom, Mobile Radio Conference, Nov. 15, 1991, pp. 193–200.

Primary Examiner—Douglas W. Olms
Assistant Examiner—Shick Hom
Attorney, Agent, or Firm—Sughrue, Mion, Zinn, Macpeak & Seas, PLLC

[57] ABSTRACT

A method of performing cellular digital radiocommunications in a TDMA system implemented within a network of geographical cells through which mobile stations (SM1 to SM22) travel, a base station being associated with each of the cells, a mobile station communicating via the base station that is associated with the cell in which the mobile station is located. Each each of the frames in the up transmission direction, from the mobile stations to the base station, contain at least one shared time slot (IT6) which is allocated to at least two distinct mobile stations (SM7 to SM22). For each shared time slot (IT6), the system has a list (31) of the active mobile stations, an active mobile station being a mobile station to which the shared time slot is allocated, and which satisfies at least one predetermined selection criterion. For, each frame in the up transmission direction, the system associates each shared time slot with a mobile station chosen from the list of the active mobile stations associated with the shared time slot, the choice being made by using a predetermined strategy.

23 Claims, 4 Drawing Sheets

PACKET ACCESS METHOD IN A CELLULAR DIGITAL RADIO-COMMUNICATIONS SYSTEM

The invention relates to data radiocommunications. The invention is particularly applicable to cellular digital radiocommunications systems for mobile stations, such as systems designed in compliance with the GSM (Global System for Mobile communications) public radiotelecommunications standard.

In general, a cellular digital radiocommunications system is implemented within a network of geographical cells through which mobile stations travel. A base station is associated with each cell, and a mobile station communicates via the base station that is associated with the cell in which the mobile station is located.

In this type of system, the calls in stable mode are conveyed over traffic channels (TCHs) in both transmission directions, namely in the direction from the mobile station to the base station (up direction), and in the direction from the base station to the mobile station (down direction).

In addition, this type of system implements time-division multiplexing using a technique referred to as "TDMA" (Time Division Multiple Access).

In known manner, the TDMA technique consists in dividing up time into frames of fixed and predetermined duration, which frames are themselves divided up into time slots. Thus, the signals conveyed by the system are organized in frames, and each time slot of a frame corresponds to a traffic channel on which a call in stable mode can be conveyed in one direction.

On transmission, in each frame in the up direction, a mobile station transmits data during the time slot which is allocated to it only. In each frame in the down direction, the base station transmits data in each of the time slots so as to communicate simultaneously with a plurality of mobile stations, each of which is associated with a respective one of the time slots.

On reception, each mobile station knows how to extract the time slot which is addressed to it from each frame in the down direction. Similarly, the base station knows which mobile station is associated with each of the time slots in the frames that it receives.

In conventional systems, of the type described above, a time slot is allocated to a mobile station for the entire duration of a call. This may be referred to as "circuit mode" allocation.

Such circuit mode allocation suffers from a major drawback, namely that the transmission resources are under-used. During a call between a mobile station and a base station, these two entities do not transmit data continuously. In other words, there are time slots during which no data is transmitted.

A known solution to remedy that drawback consists in using at least one of the time slots in each frame in packet mode. In packet mode, a time slot (i.e. a traffic channel) in the up direction is shared between a plurality of mobile stations. Thus, a mobile station which wishes to share a traffic channel with other mobile stations sends an allocation request over an access channel (the RACH or Random Access Channel in the GSM system). All of the mobile stations to which the system responds favorably for such allocation requests are associated with a shared traffic channel, and a virtual circuit is made available to each of them (unlike the real circuit made available to a mobile station to which a time slot has been allocated with no sharing for the entire duration of a call).

There are several known techniques for determining which of the mobile stations associated with the same shared traffic channel can actually transmit data.

A first known technique of allocating the right to transmit data operates as follows: the base station indicates to all of the associated mobile stations whether or not the shared traffic channel in the up direction is free. If it is free, a mobile station which wishes to transmit data to the base station sends an access request over the shared traffic channel in the up direction. The base station replies in the down direction by authorizing the mobile station to transmit data over the shared traffic channel in the up direction. The mobile station then monopolizes the traffic channel until it has no more data to transmit.

In the down direction, packet mode poses no problem: the base station places, in the shared time slot contained in each frame that it transmits, data addressed to a mobile station together with an identifier for identifying the mobile station making it possible to distinguish it unambiguously from the other mobile stations associated with the same shared time slot.

Unfortunately, in the up direction, packet mode suffers from several drawbacks.

Firstly, when two mobile stations try to access the shared traffic channel (or request authorization to transmit data) at the same time there is a collision. The two mobile stations must then try again, e.g. after a random lapse of time. The number of mobile stations must remain limited so as to reduce the number of collisions, and thus to make it easier and quicker for mobile stations to access a shared time slot.

Furthermore, clearly a mobile station which has a large quantity of data to transmit monopolizes the shared time slot for a long time. This is unacceptable for the other mobile stations associated with the shared time slot, and waiting for it to become free so that they can transmit data.

A second known technique, which attempts to mitigate the drawbacks of the first known technique, consists in granting access to a shared time slot successively and after a fixed lapse of time to all of the mobile stations associated with the shared time slot, i.e. to each of the mobile stations which, after it has made an allocation request, has been allocated the shared time slot for the entire duration of its call.

That second known technique does prevent a mobile station from monopolizing the shared time slot. Unfortunately, it suffers from the drawback of granting access to the shared time slot to associated mobile stations even at times when those mobile stations have nothing to transmit. In other words, the use of the transmission resources is not optimized.

A particular object of the invention is to mitigate the various drawbacks of the state of the art.

More precisely, an object of the present invention is to provide a packet access method in a cellular digital radiocommunications system implementing a TDMA technique, which method requires no modification to be made to the frame structure of the system in which it is implemented.

Another object of the invention is to provide such a method whose implementation requires no additional transmission resources.

Another object of the invention is to provide such a method which, in the presence of large amounts of data traffic, continues to offer high performance in terms of resource sharing.

Another object of the invention is to provide such a method which makes it possible to limit the number of access collisions, and thus to reduce the time lapses between data transmission periods for the same mobile station associated with a shared traffic channel.

Yet another object of the invention is to provide such a method making it possible to monitor the traffic flow at the mobile station.

These various objects, and others that appear below are achieved according to the invention by means of a method of performing cellular digital radiocommunications in a time division multiple access system implemented within a network of geographical cells through which mobile stations travel, a base station being associated with each of the cells, a mobile station communicating via the base station that is associated with the cell in which the mobile station is located;

- the system conveying signals organized in frames, each of which is constituted by N time slots, between the base station associated with a cell and the mobile stations located in that cell, it being possible to associate each time slot with a distinct call between the base station and one of the mobile stations;
- each of the frames in the up transmission direction, from the mobile stations to the base station, containing at least one shared time slot which is allocated to at least two distinct mobile stations;
- the system having a list of the active mobile stations for each shared time slot, an active mobile station being a mobile station to which the shared time slot is allocated, and satisfying at least one predetermined selection criterion;
- and, for each frame in the up transmission direction, the system associating each shared time slot with a mobile station chosen from the list of the active mobile stations associated with the shared time slot, the choice being made by using a predetermined strategy.

The principle of the invention is thus to distinguish those of the mobile stations associated with each shared time slot that are active from those that are not, and to guarantee a minimum service (in terms of transmission time) to the active mobile stations. In other words, in each set of mobile stations to which the same shared time slot has been allocated, a subset of active mobile stations is established.

Thus, as a function of a predetermined strategy, the system actually grants access to a shared time slot, e.g. successively, to each of the active mobile stations on the list associated with the shared time slot, and not to all of the mobile stations associated with the shared time slot (i.e. having obtained authorization to use it).

In this way, the use of transmission resources is optimized since only the active mobile stations actually share the same traffic channel (i.e. the same shared time slot). In other words, when a mobile station has no more data to transmit but its call is not ended, it remains associated with the shared time slot but it is removed from the list of active mobile stations. As a result, the system no longer actually grants it access to the shared time slot, so as to avoid leaving the shared time slot empty (i.e. not transmitting any data).

The method of the invention continues to offer high performance in the presence of large amounts of traffic. The system actually grants access to the shared traffic channel successively to each of the active mobile stations. As a result, an active mobile station that has a large quantity of data to transmit does not monopolize the shared traffic channel for a very long length of time, but rather it is allocated various access periods between which other active mobile stations can transmit data.

The strategy for choosing an active mobile station from the list may be defined in numerous ways. For example, a conventional polling technique can be used consisting in actually granting access to the shared traffic channel successively and for a fixed length of time to each of the active mobile stations on the list. It is also possible to make provision for the actual access time of each active mobile station to be of variable length, for certain active mobile stations to be actually granted access more frequently, etc.

The method of the invention also makes it possible to:

- prevent collisions on the shared traffic channel, since the mobile stations do not send transmit authorization requests over this channel; and to
- reduce collisions on the access channel since the mobile stations send only allocation requests over this channel (to enter the list for the first time), and, possibly, requests for authorization to transmit (to re-enter the list again if they have been removed from it).

Each mobile station thus makes only a few access attempts via the access channel. Therefore, the number of mobile stations can be high without collision risks being too high.

It should be noted that the method of the invention can be implemented without making any modification to the frame structure, and without adding additional transmission resources (in particular control channels and access channels).

Preferably, said list of active mobile stations is managed as a function of at least one of the following predetermined selection criteria:

- a mobile station is inserted into the list of the active mobile stations when it wishes to transmit data;
- a mobile station is removed from the list of the active mobile stations when, after being allocated a determined number of access periods, it has transmitted no data; and
- a mobile station that has been removed from the list of the active mobile stations may be put back onto the list of the active mobile stations if it wishes to transmit data once again.

Thus, a mobile station associated with a shared time slot is either on the list or off the list, and when it is off the list, it can be put back onto it if necessary.

Advantageously, the predetermined strategy used by the system to choose an active mobile station consists in allocating an access period successively to each of the active mobile stations on the list. In this way, a minimum service is guaranteed to each active mobile station on the list.

In a first advantageous implementation of the invention, the lapse of time between two access periods for any one active mobile station is fixed, the maximum duration of each of the access periods being a function of the number of active mobile stations on said list.

In a second advantageous implementation, the maximum duration of each of the access periods is fixed, the lapse of time between two access periods for any one active mobile station being a function of the number of active mobile stations on said list.

Clearly, if it has nothing else to transmit, the mobile station can stop transmitting data before the end of the maximum duration of the access period allocated to it. In this case, the shared time slot may be used by another mobile station.

Preferably, the list of the active mobile stations is managed in the base station.

In a preferred implementation of the invention, a mobile station becomes active when it receives a favorable reply from the system in response to a request for allocation of a shared time slot, which request is sent by the mobile station to the system over a time slot that is dedicated to an access channel. Thus, in a GSM system, the access channel is a RACH.

Advantageously, a mobile station becomes active again by sending a request for authorization to transmit data, the request being sent to the system over a time slot that is dedicated to an access channel.

Advantageously, the system monitors the congestion of said access channel, and, as a function of this congestion of the access channel, the system modifies the predetermined number of access periods after which a mobile station is removed from the list of the active mobile stations if it has transmitted no data.

In this way, it is possible to limit the overload on the access channel by keeping the active mobile stations longer on the list, even if they do not transmit data. It is possible to reduce the number of transmit authorization requests coming from mobile stations that wish to become active again.

Preferably, when a mobile station becomes active for the first time, the system takes account of the number of active mobile stations already associated with the various shared time slots, when choosing the shared time slot with which the new active mobile station is to be associated.

In this way, the system takes account not only of the number of mobile stations to which each shared time slot has already been allocated, but also of the number of these associated mobile stations that are active. For example, if the proportion of active mobile stations is low compared with the total number of mobile stations associated with a shared time slot, the system may decide to continue to authorize access by new mobile stations to the shared time slot.

Advantageously, an active mobile station on a first list associated with a first shared time slot may be dynamically transferred to a second list associated with a second shared time slot.

The number of active mobile stations makes it possible to know the upper and lower limits for the amount of traffic that a base station can handle. It is therefore possible to monitor the traffic flow at the base station, and, where necessary, to decide to transfer it dynamically from one list to another, i.e. to re-allocate some other shared time slot to an active mobile station.

Advantageously, an active mobile station is dynamically transferred from a first list to a second list if at least one of the following conditions is satisfied:

the number of active mobile stations on the first list is greater than a predetermined threshold number; and the active mobile station has a quantity of data to be transmitted that is greater than a predetermined threshold quantity.

If an active mobile station transmits data in the form of data blocks, then advantageously an active mobile station that is in the process of transmitting adds a first item of information to each of said data blocks so as to indicate whether or not it still has data to be transmitted.

Preferably, at least two data blocks from the same active mobile station are interleaved simultaneously over at least two shared time slots associated with the same active mobile station, at a rate of one shared time slot per frame in the up direction;

and each shared time slot is divided into at least two portions, each of which receives a portion of one of the simultaneously interleaved blocks.

In this case, advantageously, the first item of information is added to a single one of the simultaneously interleaved data blocks. In this way, if the data blocks are of fixed length, additional items of information can be added instead of the first item of information in those simultaneously interleaved data blocks to which the first item of information has not been added.

Similarly, if the system transmits data in the form of data blocks in the down direction, then advantageously as a function the predetermined strategy for making a choice, the system adds the following to each of the data blocks:

a second item of information indicating an active mobile station on the list to which the next access period in the up transmission direction is allocated; and a third item of information indicating an active mobile station to which the data block is addressed.

These second and third items of information are added at a base station sub-system to which the base station belongs.

Preferably, at least two data blocks in the down direction that are addressed to the same mobile station are interleaved simultaneously over at least two time slots associated with the same mobile station, at a rate of one time slot per frame in the down direction;

and each shared time slot is divided into at least two portions, each of which receives a portion of one of the simultaneously interleaved blocks.

In this case, advantageously, at least one of the second and third items of information is added to a single one of said simultaneously interleaved data blocks. In this way, if the data blocks are of fixed length, additional items of information can be added instead of at least one of the second and third items of information in those simultaneously interleaved data blocks to which at least one of the second and third items of information has not been added.

Other characteristics and advantages of the invention appear on reading the following description of a preferred embodiment of the invention, given by way of non-limiting example and with reference to the accompanying drawings, in which:

FIG. 1 diagrammatically shows an example of a cellular radiocommunications system in which the invention can be implemented;

FIG. 2 shows an example of the structure of a frame and the use of it with a method of the invention;

FIG. 3 diagrammatically shows an example of a list of active mobile stations from a set of mobile stations associated with the same traffic channel in accordance with the method of the invention;

Figure 8:
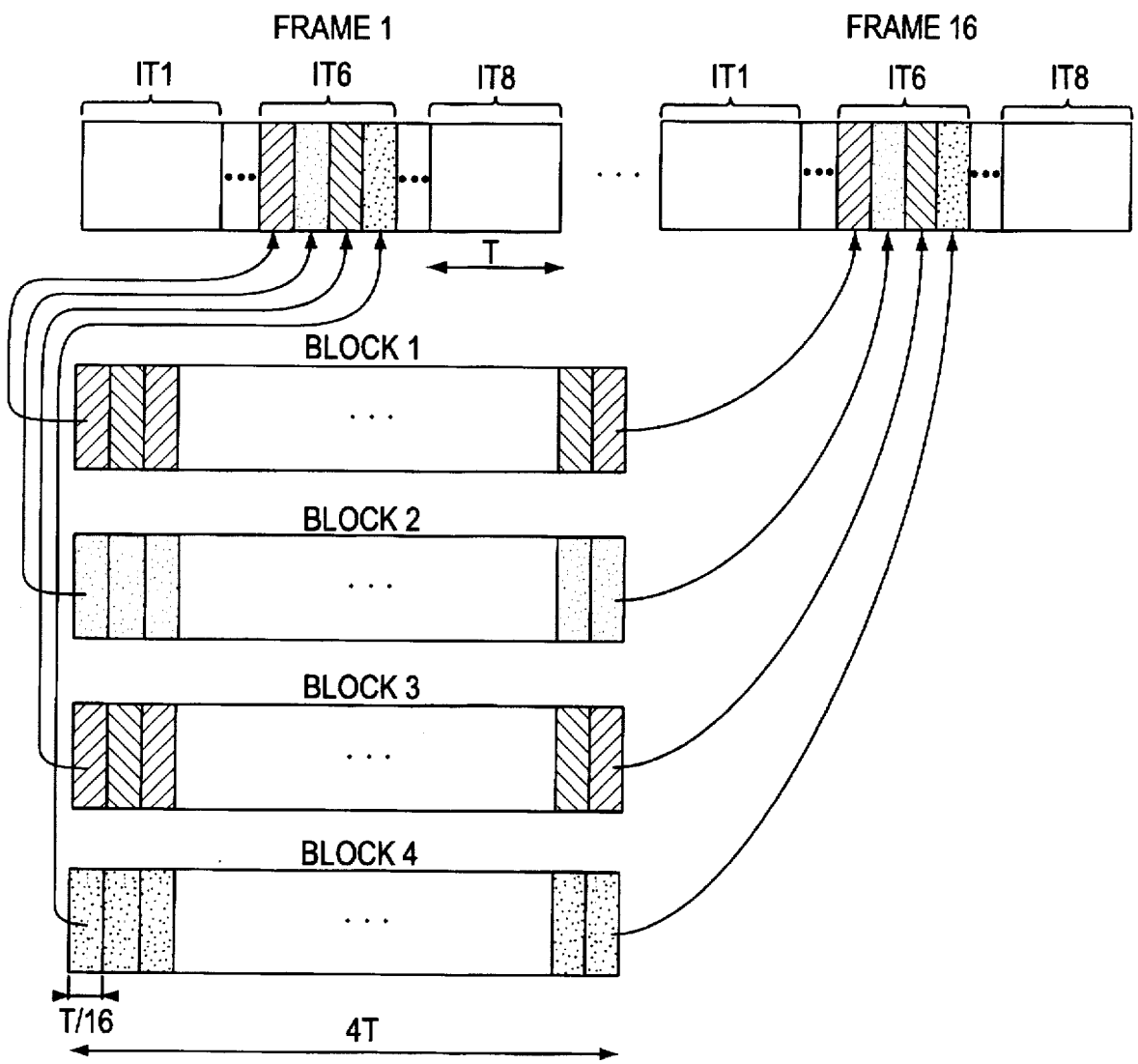
Figure 9:
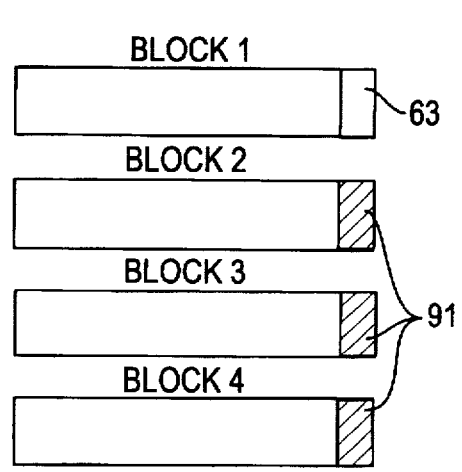
Figure 10:
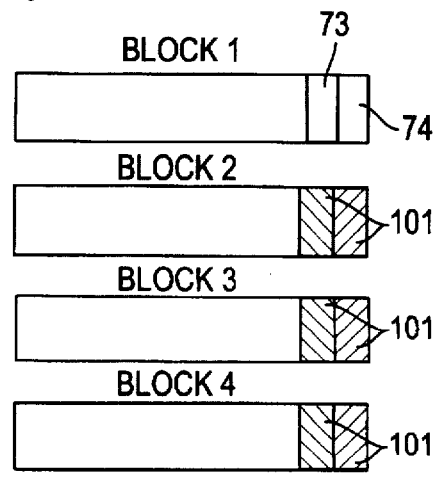

FIG. 8 diagrammatically shows an example of how data blocks may be interleaved, corresponding to a particular implementation of the method of the invention; and FIGS. 9 and 10 show examples of transmitting additional data in data blocks intended to be interleaved as shown in FIG. 8, for data blocks respectively in the up direction and in the down direction.

The invention relates to a packet access method in a cellular digital radiocommunications system.

In the remainder of the description, the system is assumed to be of the type designed in compliance with the GSM public radio telecommunications standard. Clearly, however, the invention is not limited to this particular type of system.

Figure 1:
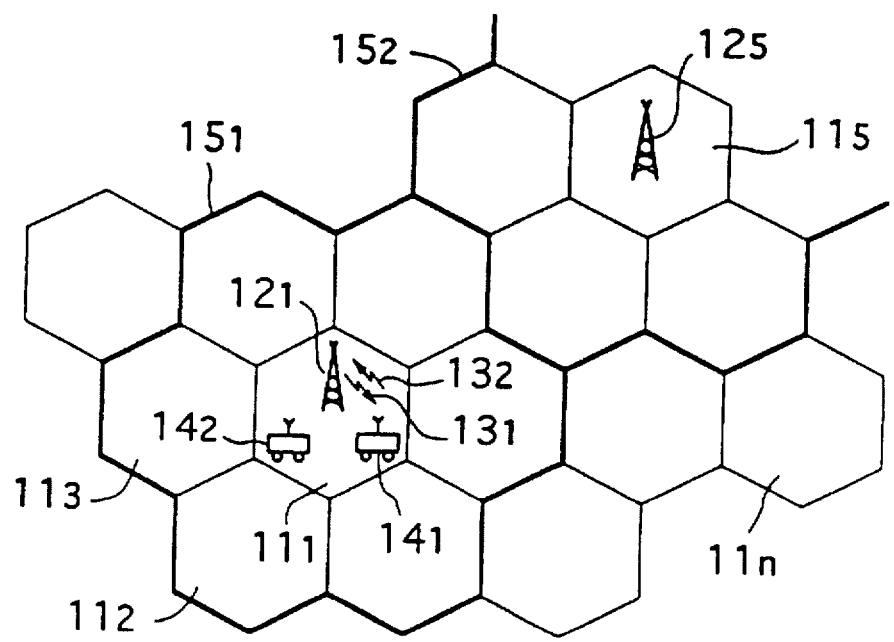

FIG. 1 diagrammatically shows an example of such a radiocommunications system. The territory covered by the radiocommunications system is divided up into cells 111 to 11n. Each cell 111, 115 includes a base station 121, 125 capable of interchanging signal frames 131, 132 with a plurality of mobile stations 141, 142 travelling in the cell 111. Frequency allocation is based on organizing the cells in patterns 151, 152 of seven cells. The cells in any one pattern use distinct frequency bands. In contrast, the frequency bands are re-used from one pattern 151 to another 152.

Figure 2:
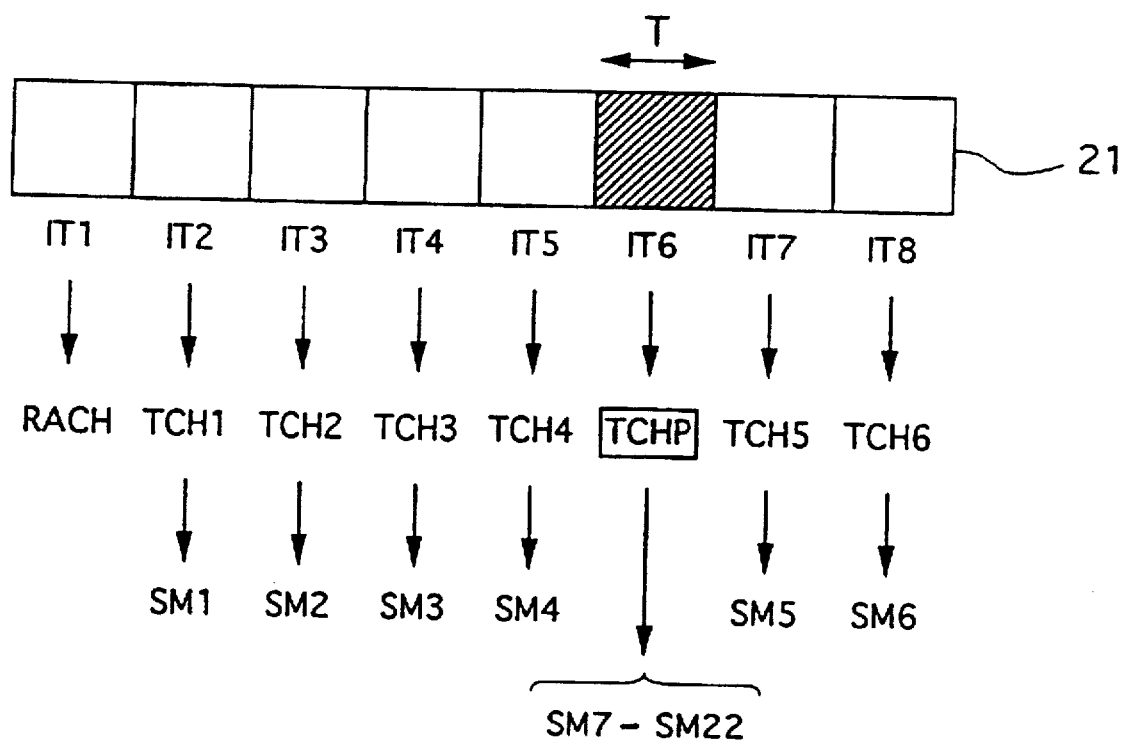

FIG. 2 shows an example of a frame structure when the radiocommunications system implements a time-division multiplexing technique of the TDMA (Time Division Multiple Access) type.

The frame 21 is made up of N time slots IT1 to IT8 (N=8 in this example). Each time slot, of duration T, can be associated with a respective transmission channel. In the example shown in FIG. 2, a time slot IT1 is associated with an access channel (RACH, for Random Access Channel) and each of the other time slots IT2 to IT8 is associated with a respective traffic channel (TCH, for Traffic Channel).

The time slots IT2 to IT8 associated with respective traffic channels are allocated using either circuit mode or packet mode. In any one frame, both allocation modes (circuit mode and packet mode) can exist simultaneously. Some time slots are then allocated in circuit mode and others are allocated in packet mode.

In circuit mode, a time slot IT2 to IT5, IT7, IT8 is allocated to a mobile station SM1 to SM4, SM5, SM6 for the entire duration of the call of the mobile station. Each mobile station thus has its own traffic channel TCH1 to TCH4, TCH5, TCH6.

In packet mode, a time slot IT6 is allocated to a plurality of mobile stations SM7 to SM22 which thus share the corresponding traffic channel TCHP. Such a time slot or traffic channel may be referred to as a shared time slot or a shared traffic channel.

The invention more precisely concerns an access protocol method for accessing a shared time slot.

According to the method of the invention, for each shared traffic channel, the system has a list of active mobile stations, i.e. a list of mobile stations which not only have been allocated the shared time slot, but also satisfy one or more selection criteria (e.g. not remaining too long without having data to transmit).

A mobile station can be inserted into the list, removed from it, or put back onto it, as explained below with reference to FIG. 5.

In the up transmission direction (from a mobile station to the base station), only the mobile stations on the list in fact have access to the shared traffic channel TCHP. In other words, only the active mobile stations share the shared traffic channel TCHP. Thus, as shown diagrammatically in FIG. 3, the list 31 of the active mobile stations SM7, SM8, SM10, SM12, SM13, SM16, SM17, SM19, SM22 associated with a shared traffic channel TCHP is a subset of the set 32 of the mobile stations SM7 to SM22 to which the shared traffic channel TCHP has been allocated.

Figure 3:
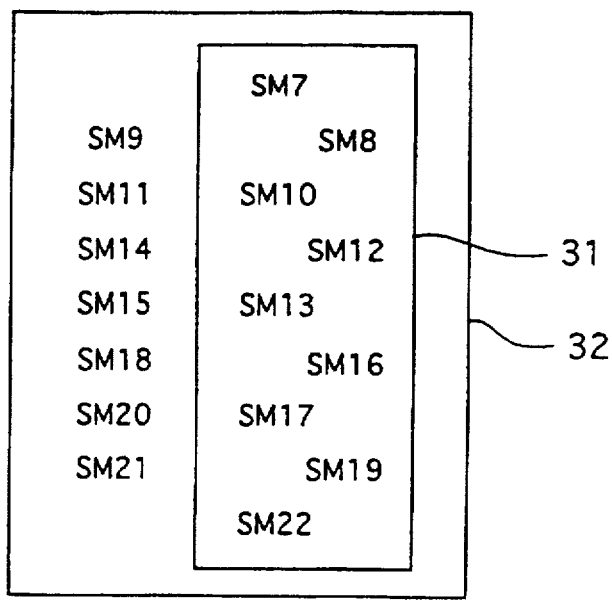
Figure 4:
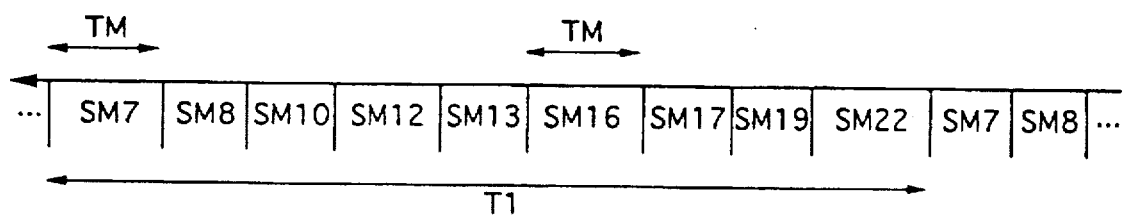
FIG. 4 shows an example of a strategy for choosing an active mobile station for a shared time slot.

For each successive frame in the up direction, the system chooses an active mobile station from the list using a predetermined strategy. FIG. 4 shows an example of such a selection strategy, with the list of active mobile stations as shown in FIG. 3. In this example, the system actually grants access to the shared time channel successively to each of the mobile stations on the list. The access period of a mobile station to the shared traffic channel (i.e. a period during which it can transmit data) ends either when the mobile station has no more data to transmit, or when the maximum duration is reached. In the latter case, the mobile station must wait for its next access period before it continues to transmit its data.

In the example shown in FIG. 4, the lapse of time T1 between two periods of access for any one active mobile station is fixed. Therefore, the maximum duration TM of each access period is a function of the number of active mobile stations on the list.

In a variant (not shown), it is the lapse of time between two access periods for any one active mobile station that is fixed. The maximum duration of each access period is then a function of the number of active mobile stations on the list.

Figure 5:
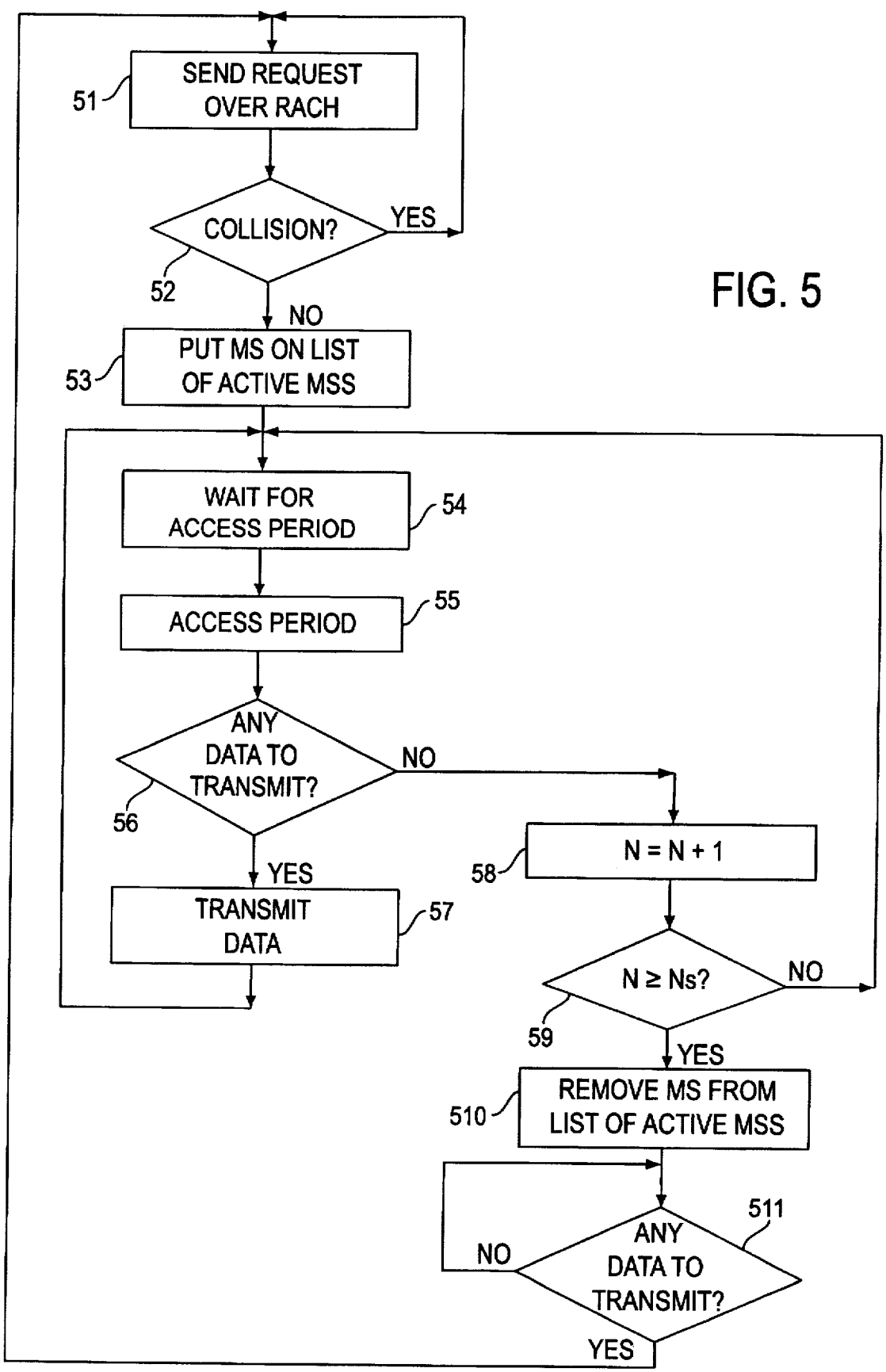
FIG. 5 shows an example of a flow chart of the method of the invention.

FIG. 5 shows an example of a flow chart of the method of the invention.

When a mobile station wishes to transmit data for the first time, it sends (51) a request for allocation of a shared time slot over the access channel.

If another mobile station transmits a request at the same time, there is a collision (52), and the two mobile stations must try again.

If there is no collision, the system records the request and allocates a shared time slot to the mobile station: this mobile station is put (53) on the list of active mobile stations associated with the shared time slot. In addition, an identifier is associated with each mobile station at the time of allocation, so as to distinguish it unambiguously from the other mobile stations associated with the same shared time slot. In other words, each of the mobile stations associated with any one shared time slot has a distinct identifier. In contrast, two mobile stations associated with two distinct shared time slots can have the same identifier.

Then, the mobile station (54) waits for the system to allocate it a period of access to the traffic channel corresponding to the shared time slot that has been allocated to it.

Once the mobile station has been allocated an access period (55), various possible situations can occur depending on whether or not the mobile station has data to transmit (56).

If the mobile station has data to transmit, it transmits it (57) during the access period, and it then waits (54) for a new access period (except, of course, if its call is over).

If the mobile station has no data to transmit, the system increments (58) by one the number N of successive access periods allocated to the mobile station without it transmitting data, the system then compares (59) the incremented number with an optionally variable determined threshold number $N_r$. If $N<N_r$, the mobile station waits (54) for a new access period (and it remains on the list). If $N \geq N_r$, the mobile station is removed (510) from the list of the active mobile stations.

It is possible to consider indicating to the mobile station that it has reached its last try before it is removed from the list, so that the mobile station knows exactly as from when it is no longer on the list. Otherwise, a mobile station can know that it is no longer on the list only if, after a certain lapse of time, the system does not actually grant it access again to the shared traffic channel. By enabling the mobile station to know exactly when it is removed from the list, the system avoids making the mobile station wait unnecessarily for an access period. In this way, when the mobile station is removed from the list and wishes to transmit data again, it immediately makes a request for authorization to transmit so as to be put back onto the list (without waiting, believing that it is still on the list, for the system to grant it actual access to the shared traffic channel).

When it is informed that it has reached its last try before it is removed from the list, a mobile station may optionally transmit arbitrary data for the sole purpose of remaining on the list.

After it has been removed from the list, if the mobile station has data to transmit (511), it can be put back onto the list if it transmits (51) a request for authorization to transmit data (indicating which time slot has already been allocated to it).

The method of the invention may have numerous other characteristics. For example, provision may be made for the system to modify the threshold number Ns after which a mobile station is removed from the list of active mobile stations if it has transmitted no data, as a function of the congestion of the access channel (RACH).

To decide which time slot to associate with a mobile station, the system may also take account of the number of mobile stations that are active (and not merely associated) for each of the shared time slots.

It is further possible to transfer dynamically a mobile station between shared time slots, e.g. if a mobile station has a large quantity of data to transmit and/or if there are a large number of active mobile stations in the list to which the mobile station belongs.

It is also possible to provide priority levels within the list of active mobile stations. For example, a mobile station that has just entered the list may be considered as being higher priority (so that it is actually granted access quicker) than an active mobile station which has transmitted nothing after several access periods.

The data transmitted by a base station or by an active mobile station is generally in the form of data blocks. The remainder of the description is more precisely concerned with examples of data blocks and a particular implementation of interleaving the data blocks.

Figure 6:
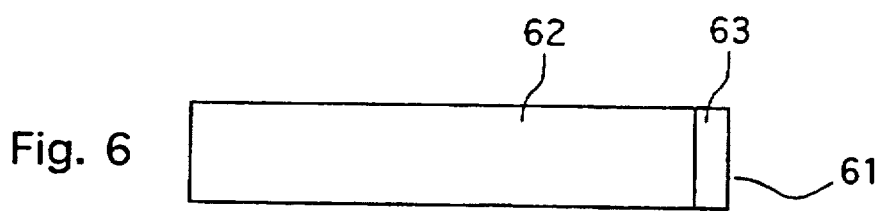
FIGS. 6 and 7 show examples of data blocks, transmitted respectively in the up direction and in the down direction.

FIG. 6 shows an example of a data block transmitted in the up direction. The data block 61 is constituted by a "conventional" data block 62 to which a first item of information 63 is added. The term "conventional" data block 62 refers, for example in GSM, to an RLP block (or frame) that can be contained in four time slots, and that contains a header, message data, and a frame control sequence. The first item of information 63 makes it possible for the mobile station to indicate to the base station whether or not it still has data to transmit. One bit therefore suffices for the first item of information.

Figure 7:
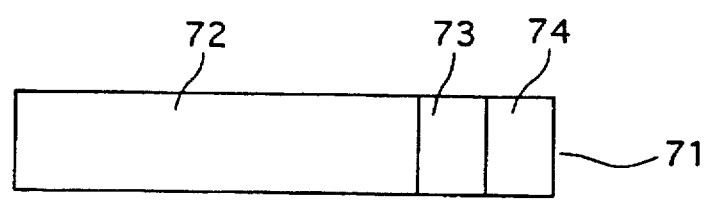

FIG. 7 shows an example of a data block transmitted in the down direction. This data block 71 is constituted by a "conventional" data block 72 (as above) to which a second item 73 and a third item 74 of information have been added (e.g. in the base station sub-system of the base station).

The second item of information 73 enables the system to indicate which active mobile station will be allocated the next period of access to the shared time slot.

The third item of information 74 is a mobile station identifier for a given shared time slot. This identifier (described above) enables the system to indicate to which active mobile station (from the active mobile stations associated with the given shared time slot) the data block 71 is addressed.

Thus, with a length of four bits for each of the second and third items of information, the system can grant one mobile station out of sixteen actual access to the shared time slot (by means of the second item of information), and send data to one mobile station out of sixteen (by means of the third item of information).

FIG. 8 diagrammatically shows an example of interleaving data blocks (in the up direction or in the down the direction).

In this example, each frame FRAME 1 to FRAME 16 comprises eight time slots IT1 to IT8 of duration T, including a shared time slot IT6. Four data blocks BLOCK 1 to BLOCK 4 in the same call are interleaved simultaneously ("rectangular" interleaving) over sixteen consecutive frames FRAME 1 to FRAME 16. For this purpose, the shared time slot IT6 of each frame is divided up into four and it receives one sixteenth of each of the four data blocks BLOCK 1 to BLOCK 4.

Clearly, the rectangular interleaving may be implemented differently. For example, two data blocks may be interleaved over eight frames, by dividing up each shared time slot into two. Similarly, other lengths of data block may be envisaged (as a function of the encoding ratio).

As shown in FIG. 9, for the data blocks in the up direction, and in FIG. 10, for the data blocks in the down direction, rectangular interleaving makes it possible, in the case of the invention, to transmit additional information.

The simultaneously interleaved blocks belong to the same call. Therefore, the item(s) of information 63, 73, 74 to be added to the "conventional" data blocks 62, 72, may be added to a single data block in each group of simultaneously interleaved blocks.

Thus, in the up direction, as shown in FIG. 9, a data block BLOCK 1 contains the first item of information 63, and the other blocks BLOCK 2 to BLOCK 4 have empty spaces 91 for transmitting additional information.

Likewise, in the down direction, as shown in FIG. 10, a data block BLOCK 1 contains the second and third items of information 73, 74, and the other blocks BLOCK 2 to BLOCK 4 have empty spaces 101 for transmitting additional information.

In the up direction, the additional information 91 is, for example, signalling data.

In the down direction, the additional information may be identifier over-encoding data, or data enabling the traffic flow to be monitored at the mobile station: for example, the base station indicates to the mobile station how many mobile stations are active, which enables the mobile station to know how much transmission time is available to it; or else, the base station warns the mobile station that it is actually going to be removed from the list, thereby enabling the mobile station to send data pre-emptively (so as to remain on the list and avoid having to send a request over the RACH for authorization to transmit data over the shared traffic channel).

The invention is described with reference to a cellular radiocommunications system because optimizing the use of the traffic channels is particularly relevant to such systems. However, the invention is clearly applicable to any type of transmission system, regardless of the transmission medium. In particular reference may be made to non-cellular radio networks (particularly in ISM (Industrial, Scientific, and Medical) frequency bands), cable networks, and optical-fiber networks, whether they cover large areas or whether they are local networks.

The invention offers a general solution to the problem posed by managing a channel shared between a plurality of users.

I claim:

1. A method of performing cellular digital radio-communications in a time division multiple access system implemented within a network of geographical cells through which mobile stations travel, a base station being associated with each of the cells, at least one of the mobile stations communicating via the base station that is associated with the cell in which the one mobile station is located;

the system being configured to convey signals organized in frames, each of which is constituted by N time slots, between the base station associated with a cell and the mobile stations located in that cell, and configured to associate each time slot with a distinct call between the base station and one of the mobile stations;

each of the frames in an up transmission direction, from the mobile stations to the base station, containing at least one shared time slot which is allocated to at least two distinct ones of the mobile stations;

said method comprising steps of:

for each shared time slot, providing a list of active mobile stations, an active mobile station being any one of the mobile stations to which the shared time slot is allocated and which additionally satisfies at least one predetermined selection criterion; and for each frame in the up transmission direction, associating the shared time slot with a specific one of the mobile stations selected from the list of the active mobile stations, the selection being based on a predetermined strategy.

2. The method according to claim 1, wherein said at least one predetermined selection criterion for providing the list of the active mobile stations comprises at least one of the following criteria:

a given one of the mobile stations is inserted into the list of the active mobile stations when the given station wishes to transmit data;

a certain one of the active mobile stations is removed from the list of the active mobile stations when, after being allocated a determined number of access periods, the certain station has transmitted no data; and a particular one of the mobile stations that has been removed from the list of the active mobile stations is put back onto the list of the active mobile stations if the particular station wishes to transmit data once again.

3. The method according to claim 1, wherein said predetermined strategy for selecting the specific active mobile station comprises allocating an access period successively to each of the active mobile stations on the list.

4. The method according to claim 3, wherein a lapse of time between two access periods for any one of the specific selected active mobile stations is fixed, a maximum duration of each of the access periods being a function of a total number of the active mobile stations on the list.

5. The method according to claim 3, wherein a maximum duration of each access period for any one of the specific selected active mobile stations is fixed, a lapse of time between two of the access periods for the one selected specific active mobile station being a function of a total number of the active mobile stations on the list.

6. The method according to claim 1, wherein the list of the active mobile stations is managed in the base station.

7. The method according to claim 1, wherein a given one of the mobile stations becomes active when the given station receives a favorable reply from the system in response to a request for allocation of a shared time slot, which request is sent by the given mobile station to the system over a time slot that is dedicated to an access channel.

8. The method according to claim 7, wherein the given mobile station, following deactivation, becomes active again by sending a further request for authorization to transmit data, the further request being sent to the system over the time slot that is dedicated to an access channel.

9. The method according to claim 7, wherein the system monitors congestion of the access channel, and wherein, as a function of the congestion of the access channel, the system modifies a value indicative of a number of access periods after which the given mobile station is removed from the list of the active mobile stations if the given station has transmitted no data.

10. The method according to claim 1, wherein, when a given one of the mobile stations becomes active a first time, the system takes account of a total number of active mobile stations already associated with a total number of available shared time slots, when allocating the shared time slot with which the given active mobile station is to be associated.

11. The method according to claim 1, further comprising dynamically transferring a particular one of the active mobile stations on the list associated with a first one of the shared time slots to the list associated with a second one of the shared time slots.

12. The method according to claim 11, wherein the particular active mobile station is dynamically transferred from the first list to the second list if at least one of the following conditions is satisfied:

a total number of the active mobile stations on the first list is greater than a predetermined threshold number; and the particular active mobile station has a quantity of data to be transmitted that is greater than a predetermined threshold quantity.

13. The method according to claim 1, wherein the active mobile stations transmit data in the form of data blocks and wherein a particular one of the active mobile stations that is in the process of transmitting adds a first item of information to each of the data blocks the particular station is transmitting so as to indicate whether or not the particular station still has data to be transmitted.

14. The method according to claim 13, wherein at least two of the data blocks from the particular active mobile station are interleaved simultaneously over at least two of the shared time slots associated with the particular active mobile station, at a rate of one shared time slot per frame in the up transmission direction;

and wherein each shared time slot is divided into at least two portions, each of the portions receiving a portion of each of the at least two simultaneously interleaved data blocks.

15. The method according to claim 14, wherein the first item of information is added to a single one of the simultaneously interleaved data blocks.

16. The method according to claim 15, wherein the data blocks are of fixed length, and wherein additional items of information other than the first item of information are added to the simultaneously interleaved data blocks other than the single data block to which the first item of information has been added.

17. The method according to claim 1, the system transmitting data in the form of data blocks in a down transmission direction, wherein, as a function of said predetermined strategy for the system adds the following to each of the data blocks:

a second item of information indicating a given one of the active mobile stations on the list selected for a next access period in the up transmission direction; and a third item of information indicating a particular one of the active mobile stations to which the data block is addressed.

18. The method according to claim 17, wherein the second and third items of information are added at a sub-system to which the base station belongs.

19. The method according to claim 17, wherein at least two of the data blocks in the down transmission direction that are addressed to the particular mobile station are interleaved simultaneously over at least, two of the shared time slots associated with the particular mobile station, at a rate of one time slot per frame in the down transmission direction;

and wherein each shared time slot is divided into at least two portions, each of of the portions receiving a portion of each of the at least two simultaneously interleaved data blocks.

20. The method according to claim 19, wherein at least one of the second and third items of information is added to a single one of the simultaneously interleaved data blocks.

21. The method according to claim 20, wherein the data blocks are of fixed length, and wherein additional items of information other than at least one of the second and third items of information are added to the simultaneously interleaved data blocks other than the single data block to which the at least one item of information has been added.

22. A method for transmitting data in a signal frame comprising a plurality of time slots, at least one of the time slots being a shared time slot allocated to a total number of at least two distinct mobile stations, comprising:

utilizing a predetermined selection criterion to produce a list of active mobile stations from the total number of the mobile stations;

selecting only one mobile station from the list of active mobile stations in accordance with a predetermined strategy; and transmitting the data in the shared time slot via the selected mobile station.

23. The method according to claim 22, wherein the list contains less then the total number of mobile stations.

* * * * *